United States Patent [19]

Bither, Jr.

[11] 3,761,572

[45] Sept. 25, 1973

[54] PALLADIUM PHOSPHIDE CHALCOGENIDES

[75] Inventor: Tom Allen Bither, Jr., Wilmington, Del.

[73] Assignee: E. I. Du Pont de Nemours and Co., Wilmington, Del.

[22] Filed: Sept. 12, 1969

[21] Appl. No.: 857,562

[52] U.S. Cl................ 423/303, 423/299, 252/62.3
[51] Int. Cl.... C01b 25/14, C01b 25/00, H01b 1/00
[58] Field of Search...................... 23/315; 252/62.3; 423/299, 303

[56] References Cited
UNITED STATES PATENTS

| | | | |
|---|---|---|---|
| 3,519,402 | 7/1970 | Hulliger | 23/315 |
| 3,561,929 | 2/1971 | Hulliger | 23/315 |
| 3,295,931 | 1/1967 | Hulliger | 23/315 |

OTHER PUBLICATIONS

Hulliger, "Nature," Vol. 198, pages 382–383 (1963).

*Primary Examiner*—M. Weissman
*Attorney*—D. R. J. Boyd

[57] ABSTRACT

Crystalline palladium phosphide chalcogenides having the formula $PdPS_xSe_{1-x}$ wherein $x$ is from 0 to 1 inclusive can be prepared by heating together stoichiometric amounts of the requisite elements or their binary compounds. These compounds have X-ray diffraction patterns that can be indexed on the basis of similar orthorhombic unit cells. They are semiconductors useful in solid state electronic devices, and also as catalysts for the replacement of aromatic hydrogen with halocarbonyl groups.

3 Claims, No Drawings

PALLADIUM PHOSPHIDE CHALCOGENIDES

FIELD OF THE INVENTION

This invention relates to novel semiconducting inorganic compounds and more particularly to novel ternary chalcogenides of palladium having semiconducting properties.

BACKGROUND OF THE INVENTION

F. Hulliger, Compt. Rend. Soc. Suisse de Physique, 35 535 (1962); Nature 198 382 (1963) and U.S. Pat. No. 3,295,931 has disclosed ternary compounds of palladium with arsenic, antimony or bismuth as the second element and sulfur, selenium or tellerium as the third element. These compounds all have a cubic, cobaltite-type structure and metallic conductivity. Hulliger has also speculated that ternary compounds including PdPS and PdPSe are expected to exist as metallic cobaltite-type phases.

SUMMARY OF THE INVENTION

The compounds of the present invention are crystalline palladium phosphide chalcogenides having the formula $PdPS_xSe_{1-x}$ wherein $x$ is from 0 to 1, characterized by X-ray diffraction powder patterns that can be indexed on the basis of similar orthorhombic unit cells and semiconductivity.

DETAILED DESCRIPTION OF THE INVENTION

The novel compounds of this invention have the formula $$PdPS_xSe_{1-x}$$

when $x$ is from 0 to 1 inclusive, that is, the relative properties of sulfur and selenium can vary continuously from PdPS to PdPSe, but contain in all cases a stoichiometric proportion of the chalcogenide. The products are crystalline and have a crystal symmetry lower than cubic. The X-ray diffraction powder patterns can all be indexed on the basis of similar orthorhombic unit cells.

The palladium phosphorus chalcogenides of this invention may be prepared by heating at a temperature of 700°–1,300°C., preferably at 900°–1,000°C., and a pressure ranging from autogenous (i.e., less than 200 atmospheres) to 65 kilobars (kbars) in case of PdPS, from autogenous to about 45 kbars in case of PdPSe, and from autogenous to about 20 kbars in case of palladium phosphide sulfide-selenides, in all cases preferably from autogenous to 20 kbars, mixtures of the requisite elements and/or their binary compounds in, preferably, the approximate stoichiometric ratio corresponding to that of the desired product.

The time of heating is not critical, but is generally from about 15 minutes to about 2 hours or more.

Commercially available, finely divided, pure elemental forms of palladium, phosphorus, sulfur, and selenium are preferred as reactants though palladium sulfides, e.g., $Pd_4S$, PdS, $PdS_2$, palladium selenides, e.g., $Pd_4Se$, $Pd_{17}Se_{15}$, $PdSe_2$, palladium phosphides, e.g., $PdP_2$, $PdP_3$, and phosphorus sulfides and selenides, e.g., $P_4S_3$, $P_4S_{10}$, $P_4S_5$, $P_4S_7$, $P_2Se_3$, $P_2Se_5$, may also be employed as reactants in conjunction with use of appropriate quantities of elementary reactants. Quaternary palladium phosphide sulfide-selenides, $PdPS_xSe_{1-x}$, may also be prepared by reaction of PdPS and PdPSe in stoichiometric ratios selected to give desired compositions. Use of reactant mixtures in which the stoichiometric ratio of the reactants differs from that of the PdP(S,Se) of the invention results in presence of impurities. Impurities may be separated by solubilization by reaction with water, manually, by dispersion and decantation, by extraction, etc.

Reaction pressure is particularly important when the reactants are not employed in the stoichiometry of the product. For example, reaction of Pd:P:S in 1:1:1 atomic ratio gives virtually homogeneous orthorhombic PdPS over the entire autogenous-65 kbar pressure range. In contrast, reaction of these same elements in 1:1:>2 atomic ratio at 600°–1,200°C. and pressures above about 40 kbars gives little or no orthorhombic PdPS. Although orthorhombic PdPSe forms at 1,000°–1,200°C. and pressures of 25 kbars and lower, little or none appears to be formed at pressures of 45 kbars and higher.

Single crystal studies of the PdPS of this invention show that it has orthorhombic crystal symmetry. Chemical analyses, density measurements, and measured orthorhombic cell dimensions show that the unit cell contains 8 molecules of PdPS. A unique composition, i.e., essentially no range of stoichiometry, is shown by the fact that the unit cell dimensions are the same for products prepared at pressures ranging from autogenous to 65 kbars. In addition, variations in the ratio of starting materials, which still give this orthorhombic phase as one of the products of the reaction, do not lead to a variation in the unit cell dimensions. As with PdPS, variations in reaction pressure and in the ratio of components employed in the Pd-P-Se reaction lead to PdPSe of the same unit cell dimensions, suggesting that it, like PdPS, has little, if any, range in compositional stoichiometry.

Like PdPS, PdPSe and quaternary $PdPS_xSe_{1-x}$ compositions give X-ray powder patterns that can be indexed on the basis of similar orthorhombic unit cells. Although the X-ray diffraction powder patterns appear to be those of isotypic compounds, a few relatively weak but indexable reflections appear in the patterns of Se-containing compositions that do not fit into the space group requirements established for PdPS. For this reason, it is not possible to state unequivocally that all the compositions of the invention are isotypic though all are indexable on the basis of similar orthorhombic unit cells.

The products of the invention may be prepared in any suitably chemically inert reaction vessel capable of withstanding the pressure developed or applied during reaction. When the reaction is conducted at autogenous pressure, it is convenient to seal the reactants under vacuum in thick-walled quartz tubing and to heat the tubes containing the reactants in a pressure vessel to which 200 atmospheres of argon is applied as a counter-balancing pressure to prevent rupture of the quartz tubes by internally developed pressure during heating. The pressure vessels in which the charged, evacuated, and sealed quartz tubes are placed may be heated internally, e.g., by electrical means. An especially useful type of pressure vessel is an argon-pressured bomb, capable of being heated to 1,400°C. by an internal platinum resistance heater. Sealed quartz tube reactors may be used at temperatures as high as 1,350°C. with a back-up pressure of 3 kbars to prevent rupturing.

The time of heating at maximum temperature is not critical and 0.25 hour to 2 hours is usually adequate.

The rate of cooling after reaction is not critical though gradual reduction in temperature at a rate of about 25°–200°C. per hour until the product has solidified usually favors increase in the crystallite size of the product. Optionally, the temperature may be lowered very rapidly to room temperature in a matter of a few seconds, a procedure referred to hereinafter as quenching. Pressure may be allowed to drop with temperature, as in case of reactions carried out at autogenous pressure, or maintained until the product reaches room temperature, as in case of reactions conducted in the tetrahedral anvil.

Reactions at pressures greater than 3 kbars are conveniently carried out in a tetrahedral anvil pressure device as described by E. C. Lloyd, et al., Jour. of Research, National Bureau of Standards 63C, 59 (1959). In this device, the reactants are placed in a boron nitride container which fits in a graphite sleeve that serves as a resistance heater. This assembly is enclosed in a pyrophyllite tetrahedron and is placed in the anvil device which is capable of generating pressures in excess of 65 kbars. The four calibration points used to determine pressure developed in this device appear in the 1963 edition of the American Institute of Physics Handbook, Part 4, p. 43, as follows:

Bismuth I → II    25.37 ± 0.02 kbars
Bismuth II → III   26.96 ± 0.18 kbars
Thallium II → III  36.69 ± 0.11 kbars
Barium II → III    59.00 ± 1.0 kbars All compressions are made on the cold assembly and the charges are then heated to the desired temperature using an appropriate thermocouple. No pressure correction for thermocouple behavior has been introduced, standard e.m.f. tables for 1 atmosphere being employed. The pressure unit is a bar, equivalent to $10^6$ dynes/cm$^2$. The larger unit, a kilobar (kbar), equal to 1,000 bars is used herein.

A preferred method of carrying out the process of this invention involves mixing equiatomic quantities of palladium, phosphorus, and chalcogen, said chalcogen being selected from sulfur and/or selenium, sealing the mixture in a heavy-walled, evacuated quartz tube which is placed in an electrically heated pressure vessel, applying a backup pressure of 200 atmospheres of argon, and heating in about 1 hour to approximately 900°C. The reaction mixture is held at 900°C. for about 2 hours, then gradually cooled over a 3-hour period to 400°–600°C., and finally cooled to room temperature by discontinuing heating. The resulting palladium phosphide chalcogenide is removed from the quartz tube, extracted with water to remove hydrolyzable phosphorus chalcogenide impurities and, if desired, with carbon disulfide to dissolve unreacted sulfur, washed with acetone to facilitate drying, and dried. The thus-formed palladium phosphorus chalcogenides are gray to silvery in appearance.

SPECIFIC EMBODIMENTS OF THE INVENTION

This invention is further illustrated by the following examples in which parts and percentages are by weight unless otherwise stated.

EXAMPLE 1

Reaction of Pd:P:S in a 1:1:1 atomic ratio at a pressure of 65 kbars and a temperature of 1,200°C.

A 0.623-g. pellet from a mixture of 0.745 g. of Pd, 0.217 g. of P, and 0.224 g. of S was pressured to 65 kbars in a tetrahedral anvil and heated to 1,200°C. in 1 hour, held 1 hour at 1,200°C., cooled over a 4-hour period to 400°C., and quenched to room temperature. This gave a dense slug of product that could be fractured into crystals of laminar habit that were metal-like in color. X-ray precession photographs taken on single crystals showed that the material had orthorhombic symmetry (space group $P2_1ca$ or $Pmca$) with cell dimensions $a = 5.69$, $b = 13.33$, $c = 5.68$A. The X-ray diffraction powder pattern obtained upon these crystals with a Hägg-Guinier camera using monochromatic Cu radiation and a KCl internal standard ($a = 6.2931$A) is given in Table I:

TABLE I

X-Ray Diffraction Powder Pattern of PdPS

| Intensity* | hkl | d Spacing, A |
|---|---|---|
| 5 | 020 | 6.6500 |
| 15 | 011 | 5.2171 |
| 100 | 111 | 3.8465 |
| 20 | 121 | 3.4413 |
| 15 | 040 | 3.3250 |
| 5 | 131 | 2.9773 |
| 5 | 200 | 2.8443 |
| 50 | 002 | 2.8380 |
| 75 | 210 | 2.7826 |
| 5 | 220 | 2.6167 |
| 50 | 211 | 2.4981 |
| 50 | 112 | 2.4948 |
| 10 | 230 | 2.3975 |
| 5 | 122 | 2.3739 |
| 10 | 042 | 2.1591 |
| 10 | 202 | 2.0099 |
| 75 | 212 | 1.9873 |
| 5 | 232 | 1.8310 |
| 75 | 113 | 1.7798 |
| 50 | 321 | 1.7376 |
| 20 | 123 | 1.7341 |
| 2 | 133 | 1.6648 |
| 15 | 302 | 1.5777 |
| 2 | 213 | 1.5648 |
| 2 | 262 | 1.4895 |
| 2 | 400 | 1.4235 |
| 5 | 004 | 1.4194 |
| 20 | 323 | 1.3138 |
| 5 | 144 | 1.2725 |
| 10 | 412 | 1.2665 |
| 15 | 214 | 1.2646 |

*An intensity value of 100 is assigned to the strongest line of the pattern.

This X-ray diffraction powder pattern can be indexed on the basis of an orthorhombic unit cell with $a = 5.693$, $b = 13.305$, $c = 5.687$A (unit cell volume 430 A$^3$), in agreement with the results of the single crystal X-ray measurements.

A second sample of this material was prepared in the same manner as previously described and, following extraction with carbon disulfide and then acetone, was observed to have the same X-ray diffraction powder pattern as that given in Table I. Elemental analyses for Pd, P, and S indicated these to be present in the atomic ratio Pd:P:S = 1.00:1.00:1.10, which within the limits of experimental error correspond to PdPS. The PdPS was found to have a measured density of 5.13 g/cm$^3$. From the volume of the orthorhombic unit cell (430 A$^3$), the molecular weight (169.4) and this measured density, 8 formula weights per unit cell are indicated, i.e., $n_{calc} = 7.84$ (see "Introduction to Solids," L. V. Azároff, McGraw-Hill, 1960, pp. 53, 54).

Four probe resistivity measurements on a single crystal of the PdPS phase showed it to be a semiconductor with resistivities $\rho_{298°\ K} = 9 \times 10^7$ and $\rho_{425°\ K} = 3 \times 10^4$ ohm-cm and an activation energy of resistivity, Ea, of 0.7 eV. This material, on exposure to ultraviolet, visible, or infrared radiation, showed a modest degree of photoconductivity, as noted by a decrease in its resistance (Example B).

Optical transmission was measured on a crystal platelet, and a band edge near a wavelength of 0.9μ was observed, indicating an optical band gap, ΔE, of about 1.38 eV. This value is in excellent agreement with the activation energy of resistivity, Ea = 0.7 eV, reported above (Ea is identical to ΔE/2). The geometry of the crystal platelet used in the optical measurements was such that the refractive index, $n$, of PdPS could also be determined from the same data. A value of $n$ between 3.1 and 3.6 was calculated.

Magnetic susceptibility measurements showed that the PdPS was diamagnetic.

EXAMPLE 2

Reaction of Pd:P:S in a 1:1:1.5 atomic ratio at a pressure of 40 kbars and a temperature of 1,000°C.

A 0.550-g. pellet from a mixture of 1.170 g. of Pd, 0.341 g. of P, and 0.529 g. of S was pressured to 40 kbars in a tetrahedral anvil, heated for 2 hours at 1,000°C., gradually cooled over a 4-hour period to 400°C., and quenched to room temperature. Most of this product consisted of silvery crystals. Following extraction with water and acetone and drying, the Debye-Scherrer X-ray diffraction powder pattern of the product was the same as that of Example 1 (Table I) except for four extra weak diffraction lines, perhaps arising from a minor amount of $PdS_2$ impurity, formed as a consequence of the stoichiometric excess of S used as a reactant. Equivalence of the unit cell sizes of PdPS prepared from stoichiometric (Example 1) and non-stoichiometric (this example) amounts of starting material and over a range of pressure from 65 kbars to autogenous (Examples 1–4), is indicative of an essentially constant P/S ratio in PdPS.

The PdPS produced in this example catalyzed the replacement of aromatic hydrogen in benzene with halocarbonyl, thus leading to the formation of benzoyl chloride (Example A).

EXAMPLE 3

Reaction of Pd:P:S in a 1:1:1 atomic ratio at a pressure of 3 kbars and a temperature of 1,200°C.

A mixture of 0.316 g. of Pd, 0.092 g. of P, and 0.095 g. of S in powder form was sealed under vacuum in heavy walled quartz tubing. The sealed tube was then heated for 2 hours at 1,200°C. under an external argon pressure of 3 kbars and cooled over a 4-hour period to 400°C. whereupon heating was discontinued. After treatment with warm water to remove some hydrolytically unstable yellow solid, the resultant product consisted of silvery platelets. A Debye-Scherrer X-ray diffraction powder pattern taken upon these platelets was the same as that of the product of Example 1 (Table I), indicating the product to be PdPS of orthorhombic symmetry.

The product was heated under an atmosphere of argon in a differential thermal analyzer. It was stable up to about 800°C., at which temperature heat was absorbed and decomposition took place.

EXAMPLE 4

Reaction of Pd:P:S in a 1:1:1 atomic ratio at autogenous pressure and a temperature of 900°C.

A mixture of 0.358 g. of Pd, 0.104 g. of P, and 0.107 g. of S in powder form was sealed under vacuum in quartz tubing. The tube was heated for 2 hours at 900°C. under an external back-up pressure of argon of 200 atmospheres, and cooled over a 3-hour period to 600°C., whereupon heating was stopped. The product consisted of a gray powder containing a small amount of tiny, silvery, plate-like crystals. This product was extracted with aqueous acetone and dried in air. Debye-Scherrer X-ray diffraction powder patterns upon both the powder and small crystals were identical to that of the product of Example 1 (Table I), indicating these materials to be PdPS.

EXAMPLE 5

Reaction of Pd:P:Se in a 1:1:1 atomic ratio at autogenous pressure and a temperature of 900°C.

A mixture of 0.340 g. of Pd, 0.0991 g. of P, and 0.253 g. of Se was sealed under vacuum in quartz tubing. Reaction was effected at 900°C. in the manner described in Example 4. The resulting product consisted of an elongated silvery mass which had a Debye-Scherrer X-ray diffraction powder pattern (Table II) that could be indexed on the basis of an orthorhombic unit cell with $a = 5.856$, $b = 13.569$, $c = 5.824$ A (unit cell volume 463 $A^3$).

TABLE II

X-ray Diffraction Powder Pattern of PdPSe

| Intensity* | h | k | l | d Spacing, A |
|---|---|---|---|---|
| 55 | 1 | 1 | 1 | 3.9515 |
| 20 | 0 | 3 | 1 | 3.5680 |
| 100 | 0 | 4 | 0 | 3.3980 |
| 10 | 1 | 3 | 1 | 3.0475 |
| 55 | 0 | 0 | 2 | 2.9131 |
| 60 | 2 | 1 | 0 | 2.8621 |
| 30 | 0 | 5 | 1 | 2.7127 |
| 20 | 2 | 2 | 0 | 2.6932 |
| 35 | 1 | 4 | 1 | 2.6199 |
| 65 | 1 | 1 | 2 | 2.5633 |
| 25 | 2 | 3 | 0 | 2.4571 |
| 35 | 2 | 3 | 1 | 2.2653 |
|  | 0 | 4 | 2 | 2.2103 |
| 2 | 2 | 4 | 1 | 2.0697 |
| 30 | 2 | 1 | 2 | 2.0407 |
| 10 | 2 | 5 | 0 | 1.9895 |
| 5 | 3 | 0 | 0 | 1.9497 |
| 50 | 1 | 5 | 2 | 1.8795 |
| 40 | 1 | 1 | 3 | 1.8263 |
| 85 | 0 | 3 | 3 | 1.7843 |
| 15 | 1 | 6 | 2 | 1.7089 |
| 5 | 2 | 5 | 2 | 1.6427 |
| 15 | 3 | 0 | 2 | 1.6218 |
| 15 | 3 | 1 | 2 | 1.6098 |
| 15 | 1 | 8 | 1 | 1.5693 |
| 20 | 2 | 6 | 2 | 1.5249 |
| 5 | 4 | 0 | 0 | 1.4643 |
| 20 | 4 | 2 | 0 | 1.4311 |
| 15 | 1 | 9 | 1 | 1.4155 |
| 5 | 3 | 5 | 2 | 1.3914 |
| 5 | 0 | 7 | 3 | 1.3731 |
| 5 | 1 | 3 | 4 | 1.3475 |
| 5 | 2 | 0 | 4 | 1.3041 |
| 5 | 1 | 5 | 4 | 1.2541 |
| 5 | 0 | 10 | 2 | 1.2296 |
| 5 | 2 | 4 | 4 | 1.2171 |
| 5 | 1 | 9 | 3 | 1.1669 |
| 5 | 4 | 7 | 1 | 1.1446 |
| 10 | 0 | 3 | 5 | 1.1280 |
| 2 | 5 | 3 | 1 | 1.1127 |
| 5 | 1 | 4 | 5 | 1.0828 |
| 5 | 0 | 5 | 5 | 1.0702 |
| 5 | 5 | 3 | 2 | 1.0562 |
| 5 | 1 | 9 | 4 | 1.0303 |
| 5 | 1 | 13 | 1 | 1.0127 |

*An intensity of 100 is assigned to the strongest line of the pattern.

Elemental analyses of the material indicated the atomic ratio of Pd:P:Se to be 1.00:1.04:0.94, which within the limits of experimental error corresponds to the formula PdPSe.

EXAMPLE 6

Reaction of Pd:P:Se in a 1:1:1 atomic ratio at a pressure of 20 kbars and a temperature of 1,000°C.

A 0.699-g. pellet from a mixture of 1.278 g. of Pd, 0.373 g. of P, and 0.948 g. of Se was pressured to 20 kbars in a tetrahedral anvil and heated for 2 hours at 1,000°C., cooled over a 4-hour period to 400°C., and quenched to room temperature. A dense slug of product was obtained that upon fracture gave silvery, blade-like crystals at the sample ends. The Debye-Scherrer X-ray diffraction powder pattern of these crystals was the same as that of the product of Example 5, indicating them to be PdPSe.

Crystals of PdPSe were isolated from a second run in which conditions were similar to those used to obtain the material described above. These crystals had the same Debye-Scherrer X-ray diffraction powder pattern of Example 5. Four probe resistivity measurements made on one of these crystals of PdPSe showed it to be a semiconductor with resistivities $\rho_{60°\ K} = 4 \times 10^3$, $\rho_{300°\ 4K} = 30$, $\rho_{400°\ K} = 1$ ohm-cm and an activation energy of resistivity, Ea, of 0.15 eV over the temperature range $\rho_{300°-400°K}$.

EXAMPLE 7

Reaction of Pd:P:Se in a 1:0.67:1.33 atomic ratio at a pressure of 25 kbars and a temperature of 1,000°C.

A 0.719-g pellet, pressed from a mixture of 1.277 g. of Pd, 0.248 g. of P, and 1.263 g. of Se, was pressured to 25 kbars in a tetrahedral anvil and was then heated and cooled in the manner of Example 6. The product resembled that of Example 6. The Debye-Scherrer X-ray diffraction powder pattern of the product matched that of the PdPSe of Example 5 in part, but also contained extra diffraction lines corresponding to unidentified material arising as a consequence of the departure from an initial Pd:P:Se = 1:1:1 charge. The equivalence of the unit cell size of PdPSe prepared from stoichiometric (Examples 5, 6) and nonstoichiometric (this example) quantities of starting material is indicative of an essentially constant P/Se ratio in PdPSe.

EXAMPLE 8

Reaction of Pd:P:S:Se in 1:1:0.75:0.25 atomic ratio at a pressure of 20 kbars and a temperature of 1,000°C.

A 0.605-g pellet from a mixture of 0.532 g. of Pd, 0.155 g. of P, 0.120 g. of S, and 0.099 g. of Se was reacted in the manner of Example 6. Silvery, blade-like crystals mixed with a minor amount of yellow-brown powder were formed. A Debye-Scherrer X-ray diffraction powder pattern was obtained upon this product (Table III), and 35 of the 39 observed diffraction lines could be indexed on the basis of an orthorhombic unit cell with $a = 5.738$, $b = 13.499$, $c = 5.698$ A (unit cell volume 441 A$^3$). Assuming a Vegard's rule relationship (see "Concise Chemical and Technical Dictionary", H. Bennett, Chemical Publishing Co., 1962) between the unit cell volumes of the end members PdPS, V = 430 A$^3$ (Example 1), and PdPSe, V = 463 A$^3$ (Example 5), the volume of the unit cell of the material of this Example (441 A$^3$) indicates the approximate composition PdPS$_{0.67}$Se$_{0.33}$, which is in relatively good agreement with the initial reaction charge. The four unindexed diffraction lines are attributed to the presence of unidentified, extraneous material.

TABLE III

X-ray Diffraction Powder Pattern of PdPS$_{0.67}$Se$_{0.33}$ Phase

| Intensity* | h | k | l | d Spacing, A |
|---|---|---|---|---|
| 15 | 0 | 2 | 0 | 6.7350 |
| 5 | 0 | 1 | 1 | 5.2507 |
| 5 | 1 | 2 | 0 | 4.4208 |
| 75 | 1 | 1 | 1 | 3.8858 |
| 5 |  |  |  | 3.7416 |
| 30 | 1 | 2 | 1 | 3.4689 |
| 100 | 0 | 4 | 0 | 3.3684 |
| 25 | 1 | 3 | 1 | 3.0010 |
| 80 | 0 | 0 | 2 | 2.8528 |
| 50 | 2 | 1 | 0 | 2.8014 |
| 40 | 0 | 5 | 0 | 2.7155 |
| 10 | 1 | 4 | 1 | 2.5949 |
| 25 | 2 | 1 | 1 | 2.5252 |
| 25 | 2 | 3 | 0 | 2.4156 |
| 35 | 1 | 5 | 1 | 2.2389 |
| 35 | 0 | 4 | 2 | 2.1764 |
| 20 | 2 | 0 | 2 | 2.0191 |
| 25 | 2 | 1 | 2 | 1.9999 |
| 15 | 0 | 5 | 2 | 1.9529 |
| 10 | 3 | 1 | 0 | 1.8912 |
| 20 | 2 | 5 | 1 | 1.8616 |
| 25 | 2 | 3 | 2 | 1.8434 |
| 40 | 1 | 1 | 3 | 1.7892 |
| 60 | 2 | 6 | 0 | 1.7715 |
| 70 | 0 | 3 | 3 | 1.7487 |
| 5 | 3 | 3 | 1 | 1.6784 |
| 2 |  |  |  | 1.6067 |
| 5 |  |  |  | 1.5126 |
| 5 | 2 | 3 | 3 | 1.4951 |
| 15 | 4 | 2 | 0 | 1.4036 |
| 2 | 0 | 3 | 4 | 1.3582 |
| 5 | 3 | 2 | 3 | 1.3215 |
| 5 | 2 | 0 | 4 | 1.2761 |
| 5 | 0 | 11 | 0 | 1.2273 |
| 2 | 1 | 10 | 2 | 1.1920 |
| 2 | 2 | 8 | 3 | 1.1549 |
| 2 |  |  |  | 1.1335 |
| 10 | 1 | 0 | 5 | 1.1178 |
| 5 | 0 | 12 | 1 | 1.1034 |

*An intensity value of 100 is assigned to the strongest line of the pattern.

EXAMPLE 9

Reaction of Pd:P:S:Se in a 1:1:0.5:0.5 atomic ratio at a pressure of 20 kbars and a temperature of 1,000°C.

A 0.635-g. pellet from a mixture of 0.500 g. of Pd, 0.146 g. of P, 0.075 g. of S, and 0.186 g. of Se was reacted in the manner of Example 6. At the sample ends, granular material was formed, and a Debye-Scherrer X-ray diffraction powder pattern was obtained thereon. The majority of the diffraction lines of this pattern could be indexed on the basis of an orthorhombic unit cell with $a = 5.755$, $b = 13,544$, $c = 5.722$ A (unit cell volume 446 A$^3$). In the manner of Example 8, use of Vegard's rule indicates the approximate composition PdPS$_{0.5}$Se$_{0.5}$, in agreement with the reaction charge.

EXAMPLE 10

Reaction of Pd:P:S:Se in a 1:1:0.25:0.75 atomic ratio at a pressure of 20 kbars and a temperature of 1,000°C.

A 0.661-g. pellet from a mixture of 0.532 g. of Pd, 0.155 g. of P, 0.040 g. of S, and 0.296 g. of Se was reacted in the manner of Example 6. As in Example 9, granular material was formed at the sample ends and a Debye-Scherrer X-ray diffraction powder pattern was obtained thereon. All diffraction lines of this pattern could be indexed on the basis of an orthorhombic unit cell with $a = 5.788$, $b = 13.540$, $c = 5.770$ A (unit cell volume 452 A$^3$). In the manner of Example 8, the use of Vegard's rule indicates the approximate composition PdPS$_{0.33}$Se$_{0.67}$, which is in relatively good agreement with the initial reaction charge.

As described in Examples 1 and 6, the palladium phosphide chalcogenides of this invention exhibit semiconducting properties with optical band gaps in the infrared region of the spectrum. Thus, they may be incorporated as one or more of the electrical components of solid state devices which, for example, may be used as transistors, thermistors, rectifiers, diodes, photoconductors, and detectors or emitters of radiation. The high refractive index observed for PdPS is a favorable property for materials functioning as light modulators.

As shown below in Example A the PdPS of this invention is useful as a catalyst, for example, in reactions involving the replacement of aromatic hydrogen with halocarbonyl, thus leading to the formation of aroyl halides.

EXAMPLE A

Benzene (75 g.) and carbon tetrachloride (50 g.) in the presence of a catalytic quantity (0.3 g.) of PdPS, prepared in the manner of Example 2, were charged into a 400 cc. Hastelloy C pressure reactor which was then pressured with 300 atmospheres of carbon monoxide. This reactor, which was run as a closed bomb, was then heated for 4 hours at 300°C. Reaction took place to give an 82.5 percent conversion to benzoyl chloride based upon carbon tetrachloride charged.

As shown below in Example B, PdPS is also a photoconductor and is thus useful for making electronic instruments such as light meters, light sensitive switches and the like.

EXAMPLE B

A 220 × 135 × 5-micron platelet of PdPS, prepared by the method of Example 1, was connected in series with an ohm meter. The dark resistance of the material was $2 \times 10^8$ ohms. Upon illumination of the platelet with an incandescent light (broad visible and infrared spectrum), the resistance dropped to $1.9 \times 10^6$ ohms. By the use of appropriate radiation sources and filters, the PdPS platelet was exposed to radiation from selected regions of the spectrum, and lowered resistances were observed as follows:

| Radiation (A.) | Resistance (Ohms) |
|---|---|
| 3650 | $4.6 \times 10^7$ |
| 4300 | $2.5 \times 10^7$ |
| 5461 | $2.2 \times 10^7$ |
| 8000 | $3 \times 10^7$ |
| Dark | $2 \times 10^8$ |

The variation in resistance of this material when exposed to radiation of different wavelengths thus permits the material to be used as a detector of radiation.

Similar results can be obtained if the PdPS is replaced with PdPSe or the compound $PdPS_xSe_{1-x}$ in Example B above.

The embodiments of the invention in which an exclusive property or privilege is claimed are defined as follows:

1. A composition having the formula $$PdPS_xSe_{1-x}$$

wherein $x$ is from 0 to 1 inclusive, characterized by semiconductivity, and when $x$ is 1 having the X-ray powder pattern of Table I, and when $x$ is 0 having the powder pattern of Table II, and each having an X-ray powder pattern which can be indexed on the basis of similar orthorhombic unit cells.

2. A compound of claim 1 having the formula $$PdPS$$

characterized by semiconductivity and having the X-ray powder pattern of Table I.

3. A compound of claim 2 having the formula $$PdPSe$$

characterized by semiconductivity and having the X-ray powder pattern of Table II.

* * * * *